Sept. 3, 1957 M. B. PICKOVER 2,805,381
ELECTRIC REGULATOR SYSTEM
Filed July 6, 1954
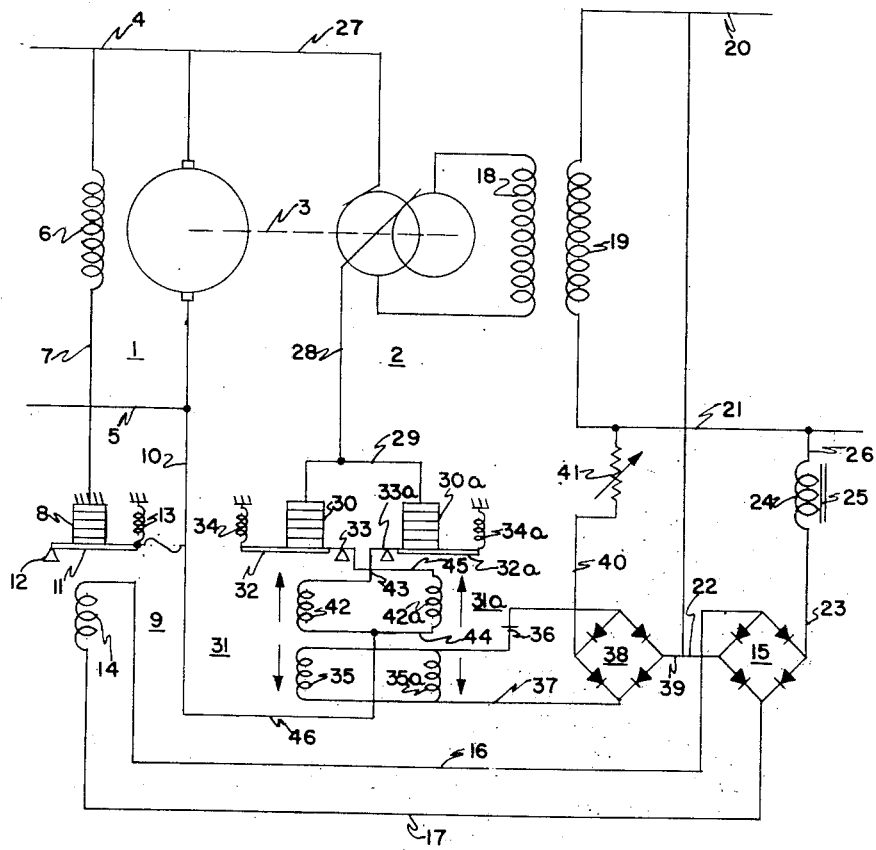
INVENTOR.
MERWIN B. PICKOVER
BY
ATTORNEY

# United States Patent Office 2,805,381
Patented Sept. 3, 1957

2,805,381

ELECTRIC REGULATOR SYSTEM

Merwin Berton Pickover, Red Bank, N. J., assignor to Bendix Aviation Corporation, Eatontown, N. J., a corporation of Delaware Application July 6, 1954, Serial No. 441,529

3 Claims. (Cl. 322—17)

The present invention relates to electrical regulating systems and more particularly to the parallel operation of variable resistance regulators for controlling the output of a dynamoelectric machine.

In some applications the requirements are such that it is necessary that the variable resistance element be able to go to a very low minimum resistance. In a carbon pile regulator, for example, it would be necessary to go to a larger regulator utilizing greater forces in order to secure the desired minimum resistance. Often such a solution is not practical due to weight restrictions, size and power requirements.

The present invention provides for the parallel operation of two regulators with equal division of current in the regulators.

It is an object of the invention to provide a novel regulator system.

Another object of the invention is to provide a novel system for the operation of two regulators in parallel.

Another object of the invention is to provide an improved circuit for operating carbon pile regulators in parallel to control the output of a dynamoelectric machine.

The above and other objects and features of the invention will appear more fully hereinafter from a consideration of the following description taken in connection with the accompanying drawing wherein one embodiment of the invention is illustrated by way of example.

In the drawing, the single figure is a schematic diagram of a system embodying the invention.

Referring now to the drawing there is indicated by the numeral 1, a motor which drives a generator 2 by means of a shaft 3. The motor 1 is illustrated as a direct current motor deriving electrical energy from a suitable D. C. source (not shown) through conductors 4 and 5. The motor 1 has a shunt field 6 whose flux determines the speed of the motor 1. One end of the field 6 is connected to the conductor 4, while the opposite end of the field 6 is connected by a conductor 7 to one end of a variable resistance carbon pile element 8 of a regulator indicated generally by the numeral 9. The opposite end of the carbon pile 8 is connected by a conductor 10 to the conductor 5.

The regulator 9 is illustrated diagrammatically herein as including an armature 11 pivoted at 12 and biased by a spring 13 in a direction for decreasing the resistance of the carbon pile element 8. Opposing the spring 13 is an electromagnetic control winding 14. The winding 14 is connected across the output terminals of a rectifier 15 by conductors 16 and 17.

The generator 2, driven by the motor 1 through the shaft 3, is illustrated as having a rotating exciting field 18 and a single phase stator winding 19. Output conductors 20 and 21 lead from the stator winding 19 to a suitable load (not shown). It is understood, however, that the generator 2 could be of a type having a stationary field and rotor armature winding, the rotating field type being shown by way of example and not as a limitation. Further, the generator may be multiphase.

One input terminal of the rectifier 15 is connected by conductor 22 to the output line 20. The other input terminal of the rectifier 15 is connected by conductor 23 to one end of a reactance winding 24 having an iron core 25. The opposite end of the winding 24 is connected by a conductor 26 to the conductor 21. The impedance of the reactance winding 24 is equivalent to the resistance it replaces at the frequency which it is desired to maintain. Thus, current in the winding 14 decreases with an increase in frequency at a constant voltage across the lines 20 and 21. The latter action in turn causes adjustment of the carbon pile 8 so as to vary the excitation of the motor winding 6 so as to maintain the desired constant motor speed. It is understood, however, that other frequency regulating means may be used.

The exciting winding 18 of the generator 2 has one end connected through conventional slip rings and conductor 27 to the conductor 4, while the opposite end is connected through conventional slip rings and conductor 28 to a conductor 29. The conductor 29 is connected to one end of carbon pile elements 30 and 30a of regulators 31 and 31a.

The regulators 31 and 31a are shown diagrammatically herein as including armatures 32 and 32a pivoted at 33 and 33a and biased by springs 34 and 34a in a direction for decreasing the resistance of the respective carbon piles 30 and 30a. Opposing the springs 34 and 34a are main electromagnetic control windings 35 and 35a. The windings 35 and 35a are connected in parallel by conductors 36 and 37 across the output terminals of rectifier 38. One input terminal of the rectifier 38 is connected by conductor 39 to the output line 20, while the other input terminal is connected by a conductor 40 to the output line 21. A variable resistor 41 may be inserted in the conductor 40 to regulate the voltage settings of the windings 35 and 35a.

In addition to the windings 35 and 35a, the regulators 31 and 31a have compensating windings 42 and 42a respectively. One end of the winding 42 is connected by conductor 43 to the other end of the carbon pile element 30a of the regulator 31a. The other end of the winding 42 is connected by conductor 44 to one end of the winding 42a. The other end of the winding 42a is connected by conductor 45 to the other end of the carbon pile element 30 of the regulator 31. A conductor 46 connects the conductor 44 to the input conductor 5 to complete the circuit connecting the carbon pile elements 30 and 30a in parallel and the parallel elements in series with the field 18 of the generator 2.

The compensating windings 42 and 42a are wound in opposition to the main windings 35 and 35a, and form a tie in between the two regulators thus insuring an equal division of the load. By a proper choice in the selection of the number of turns for the compensating windings, a flat, drooping or rising characteristic in the regulator may be obtained. Further, the compensating windings are wound in a direction so that when normal regulator action would drop the voltage with the load, the increased field current flowing in the compensating windings will oppose the main windings to decrease the pull on the armatures, thereby tending to increase the output voltage.

Thus by utilizing two regulators in parallel, with compensating windings tieing the regulators together, means are provided for obtaining a low minimum resistance and also provides greater heat dissipation than may be obtained with a single regulator of comparable size. Further, stability is obtained without the use of complicated circuits.

Although only one embodiment of the invention has been illustrated and described, various changes in the form and relative arrangement of the parts, which will now appear to those skilled in the art, may be made without departing from the scope of the invention.

What is claimed is:

1. Apparatus for regulating the output voltage of a generator having an exciting field winding, comprising a pair of substantially similar parallel connected carbon pile elements connected in series with said exciting field winding to control the energization thereof, main control windings for each of said carbon pile elements and connected to be responsive to said output voltage, and equalizer windings for each of said carbon pile elements, the equalizer winding of one of said carbon pile element being connected in series with and energized by the total current flowing in the other of said carbon pile element and the equalizer winding of the other of said regulator being connected in series with and energized by the total current flowing in the said one carbon pile element.

2. Voltage regulating means for an alternator having an exciting winding, comprising a pair of substantially similar paralleled carbon pile regulators connected in the circuit of said exciting winding to vary the energization thereof, main control windings for each of said regulators, circuit means including a rectifier for energizing said main windings in accordance with the output of said alternator, auxiliary windings for each of said regulators, circuit means for energizing the auxiliary winding of one of said regulators in accordance with the total current flowing in the other of said regulators, and circuit means for energizing the auxiliary winding of said other regulator in accordance with the total current flowing in said one regulator.

3. The combination as set forth in claim 2 in which said auxiliary windings are in opposition to said main windings.

References Cited in the file of this patent

UNITED STATES PATENTS 2,586,368     Mershon _____ Feb. 19, 1952